United States Patent [19]
Davies

[11] Patent Number: 5,950,409
[45] Date of Patent: Sep. 14, 1999

[54] FLEX HEAD TURF CUTTING UNIT

[76] Inventor: Douglas N. Davies, 1410 Cardinal La., Lantana, Fla. 33462

[21] Appl. No.: 08/858,079

[22] Filed: May 16, 1997

[51] Int. Cl.⁶ .................................................. A01D 34/42
[52] U.S. Cl. ........................................ 56/249; 56/DIG. 10
[58] Field of Search ................................ 56/294, 7, 249, 56/253, 251, DIG. 3, DIG. 10

[56] References Cited

U.S. PATENT DOCUMENTS

| | | |
|---|---|---|
| Re. 34,921 | 5/1995 | Lamusga et al. . |
| 1,818,487 | 8/1931 | Lontz . |
| 2,057,417 | 10/1936 | Clapper . |
| 2,139,200 | 12/1938 | Moyer . |
| 2,365,338 | 12/1944 | Godwin . |
| 2,972,218 | 2/1961 | Benson . |
| 3,514,926 | 6/1970 | Heth et al. . |
| 3,783,592 | 1/1974 | Schraut ................................ 56/16.9 X |
| 4,021,996 | 5/1977 | Bartlett et al. . |
| 4,345,419 | 8/1982 | Chandler . |
| 4,644,737 | 2/1987 | Arnold ....................................... 56/249 |
| 4,769,976 | 9/1988 | Bassett et al. ........................ 56/249 X |
| 4,866,917 | 9/1989 | Phillips et al. . |
| 5,293,729 | 3/1994 | Curry et al. . |
| 5,343,680 | 9/1994 | Reichen et al. . |
| 5,412,932 | 5/1995 | Schueler .................................... 56/249 |
| 5,497,603 | 3/1996 | Short . |
| 5,511,365 | 4/1996 | Rice . |
| 5,533,326 | 7/1996 | Goman et al. . |
| 5,634,325 | 6/1997 | Thorman et al. ......................... 56/249 |

*Primary Examiner*—Heather Shackelford
*Attorney, Agent, or Firm*—Quarles & Brady LLP

[57] ABSTRACT

Carriage suspension for supporting a reel mower cutting unit. Two or more elongated rollers extend between opposing ends of the carriage suspension. An arm is provided on at least one end of the carriage suspension. The arm is mounted to the carriage suspension by a pivot mechanism, and is configured for supporting one end of each of the rollers. Coupling members are provided on each end of the rollers, and the coupling members are configured for permitting the angular orientation of a longitudinal axis of each of the rollers to vary relative to the carriage suspension.

9 Claims, 4 Drawing Sheets

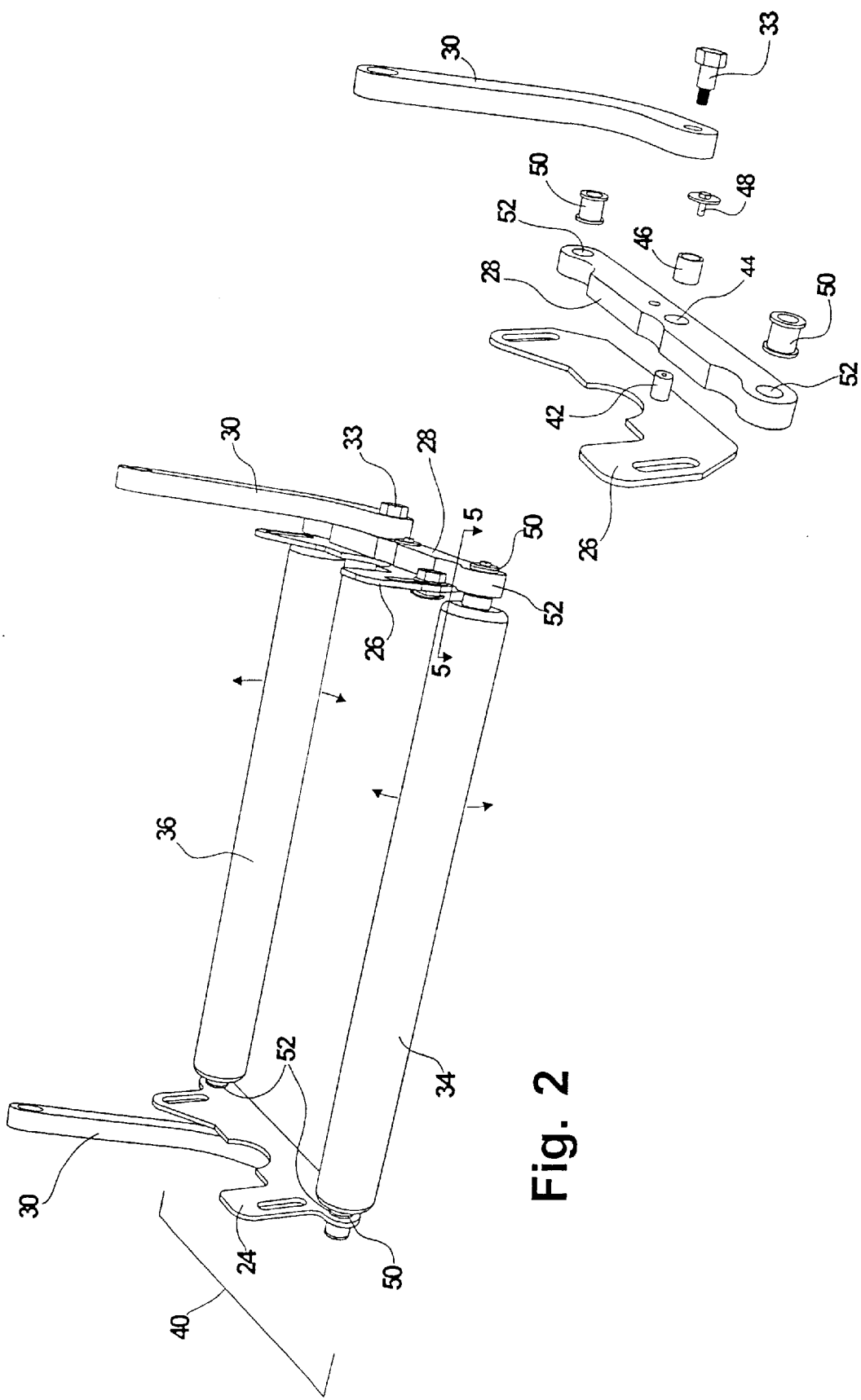

FLEX HEAD TURF CUTTING UNIT

BACKGROUND

1. Field of the Invention

The present invention relates to mowing equipment and particularly to turf cutting units designed for commercial applications such as golf courses.

2. Discussion of the Relevant Art

During approximately the last 38 years, mowing equipment designed for use by the professional turf industry has become increasingly sophisticated as standards for mower performance have become more demanding. In particular, demand has dramatically increased for a machine that can deliver the highest quality of cut on a golf course fairway which is likely to have a variety of contours. Another aspect of the industry, especially in North America, is the growth of "daily fee" golf courses, which are open to the public for a fee. As compared to the more traditional private golf clubs, daily fee courses tend to be more sensitive to competitive market forces, which demand greater cost consciousness. As a result, the demand for more cost effective mowing equipment capable of performing the highest quality cut has increased substantially as the industry has continued to evolve. The flex-head cutting unit addresses these requirements by providing a mowing machine that is more efficient than the current industry standard, employing wider cutting units which are capable of operating at higher ground speeds, without loss of quality of cut.

Due to the very large area of turf involved with commercial golf courses, turf cutting units have been developed which cut a wide path for greater efficiency. Typically, such units are either incorporated into a motorized wheeled vehicle, or can be towed behind such a vehicle. A familiar design is the reel type grass cutting mechanism which is essentially a rotating cylinder fitted with blades which cut against a static bed-knife. See, e.g., U.S. Pat. No. 5,343,680 to Reichen et al. and U.S. Pat. No. 5,497,603 to Short.

One difficulty which has long existed as concerns mowing equipment is the difficulty in achieving a balance between a cutting unit which cuts an exceptionally wide path, while also providing an exceptionally smooth and even cut. In particular, difficulty has been encountered in connection with the numerous contours and hills which typically are designed into golf courses. Typically, when such contours are encountered, conventional reel-type cutting units will have a tendency to follow ground contours unevenly, resulting in a cut which has an irregular appearance. The current industry standard for achieving the highest quality of cut on fairways is a 22" wide cutting unit which is able to deliver the requisite quality of cut, but sacrifices speed and efficiency (as opposed to wider cutting units). Another problem associated with such prior art systems relates to the speed at which they may be towed across the ground. For example, current state of the art light-weight fairway cutting units equipped with a 22" cutting heads have a maximum ground speed of about 6 miles per hour. This limits the rate at which the cutting process occurs and results in greater labor costs.

Various prior art turf cutting units have been developed to help eliminate the foregoing problems, but none have been completely satisfactory. Existing reel-type grass cutting units commonly incorporate two ground contacting rollers. The rollers generally support a frame unit which itself supports a rotating cutting cylinder. In typical systems incorporating a pair of rollers, the rollers are positioned at the front and rear of the cutting unit and are rigidly mounted to the frame. The mounting mechanism is typically designed to allow the rollers to be manually adjusted so that the height of the frame (and therefore the cutting height) may be adjusted relative to the ground.

In conventional two roller-type reel cutting units, the surfaces of the rollers which contact the ground define a plane. Where the terrain closely matches this plane, the height of cut will be constant across the width of the machine. Machines having multiple cutting units, such as is shown in U.S. Pat. No. 5,497,603, are capable of producing a uniform height of cut if the terrain closely matches the planes of its individual cutting units. However, where the terrain does not match the plane of the rollers, the height of cut will be inconsistent across the width of the cutting unit because at least a portion of one of the rollers will not be in contact with the ground. In addition, minor variations in the balance of the cutting unit (as well as the interaction between the machine and cutting unit through a suspension mechanism) make it difficult to predict which side of the cutting unit will not be in full contact with the ground. Thus, in machines with multiple cutting units, the height of cut of a particular cutting unit may not match the height of cut of its adjacent cutting units. As a result, the turf may display this discrepancy in the form of variations in heights of cut among the various cutting units, resulting in the appearance of lines in the turf that are often considered objectionable. Current state of the art designs minimize this problem by employing relatively narrow (22") cutting units.

A further problem with conventional reel-type grass cutting mechanisms relates to the conditions of the turf and the cutter mechanism weight distribution as between the front and rear rollers. Where turf conditions present a firm, unyielding surface to the cutting unit, variations in the weight distribution between the front and rear rollers will not produce any variation in height of cut, so long as there is sufficient weight on each roller to keep it solidly on the ground. However, where the surface is more elastic and spongy, cutter designs of the prior art may interact with the turf to produce variable height of cut. In particular, the added weight on one roller can cause it to penetrate the turf excessively, producing a variable height of cut.

The foregoing problem is often compounded by the positioning of the propulsion arm attachment point above the plane defined by the two rollers. In such cases, motive force provided by the propulsion arm and the resultant drag of the rollers will create torque which will tend to cause the cutting unit to rotate about its lateral axis. Where the turf is particularly heavy, the torque may be sufficient to cause the rear roller of the mower to lift off the ground, thereby producing a variation in the cutting height. This phenomenon is acknowledged in U.S. Pat. No. 5,343,680 (see column 1, lines 22–29). In that patent, it is also acknowledged that the invention described therein is an incomplete solution of this problem (see col. 6, lines 37–41). Other examples showing that designers have recognized this problem are the Toro 5100, Toro 5300, Jacobsen LF-100, and Jacobsen LF-128, where spring mechanisms linking the propulsion arm and the cutting unit cause weight to be transferred from the front roller to the rear roller. The flex-head design according to the present invention improves weight distribution between the front and rear rollers as a function of draft, thereby permitting higher ground speeds to be achieved, along with increased productivity.

SUMMARY OF THE INVENTION

A carriage suspension mechanism is provided for supporting a reel mower cutting unit. The suspension mechanism includes a pair of elongated rollers spaced apart from each other and mounted at one end to the carriage frame by couplings which allow the axes of the rollers to vary in relation to the frame. Each roller is fitted with anti-friction bearings so as to allow the outside diameter of the roller to rotate freely about its axle, which preferably remains static. A pivot frame is provided slightly spaced apart from the carriage frame. A stud is preferably formed on the pivot frame and an arm is pivotally mounted on the stud so that it can pivot in a plane which is approximately transverse to the longitudinal axis of the rollers. A second end of each of the elongated rollers is mounted to opposing ends of the arm by couplings that allow the longitudinal axes of the rollers to vary relative to the arm. Each of the couplings is configured to permit the rollers' axes to freely pivot while the axes of rotation of such rollers is varied relative to a normal orientation defined with respect to a plane aligned with each corresponding pair of roller mounts. In one embodiment described herein, bushings provided within said roller mounts are formed of a resilient material to permit the axis of the rollers to pivot relative to the carriage frame.

BRIEF DESCRIPTION OF THE DRAWINGS

FIG. 2 is a perspective view of the flex-head cutting carriage of FIG. 1 with the cutting cylinder and cover plates removed.

FIG. 3 is an exploded view of a first side of the flex-head cutting carriage in FIG. 2.

FIG. 4(*b*) is a diagram illustrating the operation of the flex-head cutting carriage.

DETAILED DESCRIPTION OF THE INVENTION

Figure 1:
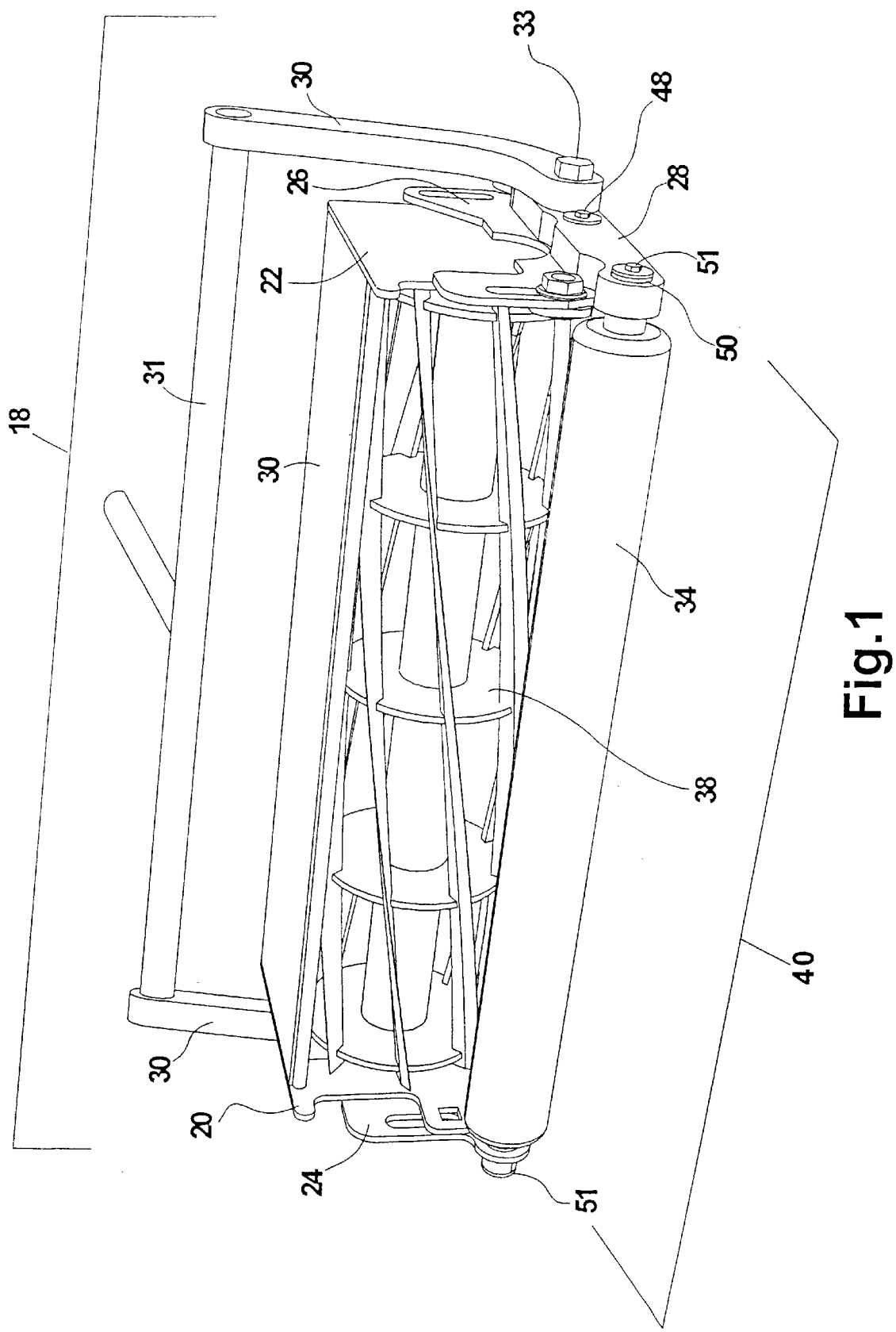
FIG. 1 is a perspective view of a flex-head carriage with a cutting cylinder installed.

Referring now to FIGS. 1 and 2, there is shown a reel-type mower 18. The mower 18 consists of a cutting reel 38, which is horizontally centrally mounted between a pair of side plates 20 and 22. Cover plate 30 spans the top of the unit between side plates 20 and 22. The designer may choose to incorporate side plate 20 into frame member 24, provided a mechanism is provided which allows the rollers to be adjusted vertically for the purpose of determining the height of cut, and suitable mounts for the rollers are incorporated into said mechanism. As is well known to those familiar with reel type mower units, the cutting reel 38 is typically driven by a hydraulic motor or a mechanical power train which transmits power through a system of belts, pulleys, chains, sprockets and drive shafts from an engine (not shown). Also, a bed knife (see FIG. 4(*b*)) traverses the distance between the plates 20. The bed knife is conventionally situated at the lower outer periphery of the cutting reel 38 and is configured so that when the cutting reel rotates, its blades pass adjacent to the bed knife to cut the blades of grass. A carriage unit 40 is incorporated into mower 18 for supporting and suspending the unit over a surface to be mowed. As shown in greater detail in FIGS. 2 and 3, the carriage unit 40 preferably consists of a pair of rollers 34, 36 which are each mounted to frame member 24 and arm 28 by a coupling or bushing 50 which permits the axes of the rollers to vary relative to the frame member 24 and arm 28. The axles on each end of the rollers are preferably internally threaded at each end and Are held in place by means of retaining bolts 51.

The carriage unit is provided with a pair of propulsion arms 30, located at each side of the unit. Propulsion arms 30 are preferably attached to a tow bar 31 which may be hitched to a tractor unit, either by itself or in a ganged arrangement, with a plurality of similar cutting units. As shown in FIG. 1, the propulsion arm 30 is attached on one side of the cutting unit to arm 28, at a location approximately horizontally aligned with the longitudinal axis of rollers 34, 36. On the opposite side of the unit, the arm is attached to carriage frame member 24 in a similar manner. In each case, the position of propulsion arms 30 is such that their attachment point is located between the front and rear rollers. The propulsion arm is preferably attached by means of a shoulder bolt 33 or any other suitable hardware to allow the arm to rotate about its lower end in a plane which is approximately transverse to the longitudinal axes of the rollers.

The location of the attachment point for propulsion arms 30 to the carriage unit 40 is significant as it can have a substantial impact on mower performance. In particular, by defining the attachment point to be (1) as close as possible to a plane defined by the longitudinal axes of the two rollers, and (2) between the front and rear rollers 34, 36, two significant advantages are achieved. First, the weight of the propulsion arms 30 is distributed so as to minimize the penetration of the rollers into the turf. Since the front and rear rollers are not necessarily identical, the designer may choose to locate the attachment point closer to one roller, most likely the rear. In particular, the front roller is likely to be a radially "grooved" type roller, which presents only a portion of its outer diameter in contact with the ground. An example of a "grooved" roller is Douglas Products part #160100. A grooved roller is more likely to penetrate the turf, due to its reduced contact area. Accordingly, locating the attachment closer to the rear roller will reduce the weight borne by the front roller, and help minimize excessive penetration into the turf. This weight distribution is particularly advantageous when the mower 18 is utilized in applications requiring exceptionally precise cutting, such as in the case of golf greens. In such applications, maintaining consistent height of cut is absolutely essential. The weight distribution accorded by the foregoing arrangement helps minimize the likelihood that either of the rollers 34, 36 will partially sink into spongy ground in a way which might otherwise produce a variable height of cut.

Further, the positioning of the propulsion arm attachment point approximately in line with the axis of the two rollers 34, 36 ensures that the force applied by the propulsion arm 30 is always equal and in direct opposition to the drag created by the rollers traversing the turf. As a result, no torquing action is created which could otherwise cause the rear roller to lift off the turf, which can cause the height of cut to vary.

As best illustrated in FIG. 3, arm 28 is pivotally mounted to pivot frame member 26 preferably by means of a pivot stud 42, which interfits with a bore 44 formed in the arm 28. A pivot bushing 46 is preferably mounted within bore 44 to protect arm 28 from wear and friction caused by the pivoting action of the arm on the pivot stud 42. In a preferred embodiment, an elastomeric material can be used to form the bushing 46. Use of an elastomeric material for this bushing allows the pivot point to have essentially zero clearance between the pivot stud and the arm, while allowing the arm to pivot freely. Minor misalignment between the pivot stud and the arm is likely to occur, and the use of a rigid material such as brass or bronze, or a design not incorporating a bushing, would cause the arm 28 to bind as it rotates about pivot 42 if the design were to specify a zero clearance fit between the pivot 42 and the arm 28. Significantly, a zero clearance pivot point is very desirable in application such as the present one, especially where the design is intended for heights of cut as low as 0.100". In such cases, allowing for clearance between pivot 42 and either arm 28 or bushing 46 (which is incorporated into the construction of arm 28), even as little as 0.005", could result in an undesirable variation in height of cut. The material of the pivot bushing 46 is preferably a resilient elastomer capable of bearing the weight of the pivot frame member 26 as well as the grass cutting mechanism. A retaining bolt 48 is threaded within the pivot stud 42 to maintain the arm 28 in position on the pivot frame member 26. Of course, any other suitable device may be used for retaining the arm 28 on the pivot stud, or the design may be implemented without any kind of retention device. Significantly, while FIG. 3 illustrates one simple design for permitting pivot arm 28 to rock back and forth on the pivot frame member 26, it should be understood that the invention is not intended to be limited in this regard, and any other suitable arrangement can be used to effect such pivoting action within the intended scope of the present invention.

Roller mounts 52 are provided on opposing ends of the arm 28 and carriage frame member 24 for receiving the axles of rollers 34, 36. As is apparent in FIG. 2, the pivoting action of the arm 28 will cause the angular orientation of the longitudinal axis of the rollers 34, 36 to vary relative to a vertical plane defined between the roller mounts 52 formed on each of the arm 28 and carriage frame member 24. It is this pivoting action of the arm, combined with resultant variable orientation of the roller axis relative to the frame members 24, 26, which allows the mower assembly to more closely follow a contoured terrain.

In order to maintain the rollers in place but simultaneously accommodate the angular variations presented by the roller axes, resilient bushings 50 are preferably provided as a coupling to fit within the roller mounts 52. The bushings 50 are preferably formed from a material such as urethane or rubber, which has a hardness corresponding to a durometer reading between about 60 and 90. Suitable resilient bushings for this purpose include Part No. 9-811G which is commercially available from Energy Suspension, Inc. of San Clemente, Calif. In general, however, the bushings are designed to be sufficiently hard to prevent undue looseness in the roller mounts but are sufficiently soft to allow the roller axes to form an angle of between about +2° and −2° with the surface of both the arm 28 and carriage frame member 24. In a preferred embodiment, the wall thickness of the bushing (defined as the radial distance between the inside and outside diameter) will depend upon several factors including the thickness of the frame member 24, the thickness of arm 28, the degree of angular variation required in a particular application to accommodate a particular type of terrain, and the type of bushings 50 used. However, for most applications, a bushing wall thickness of between about 0.188" to 0.375" is suitable in order to accommodate most types of terrains.

Figure 4A:
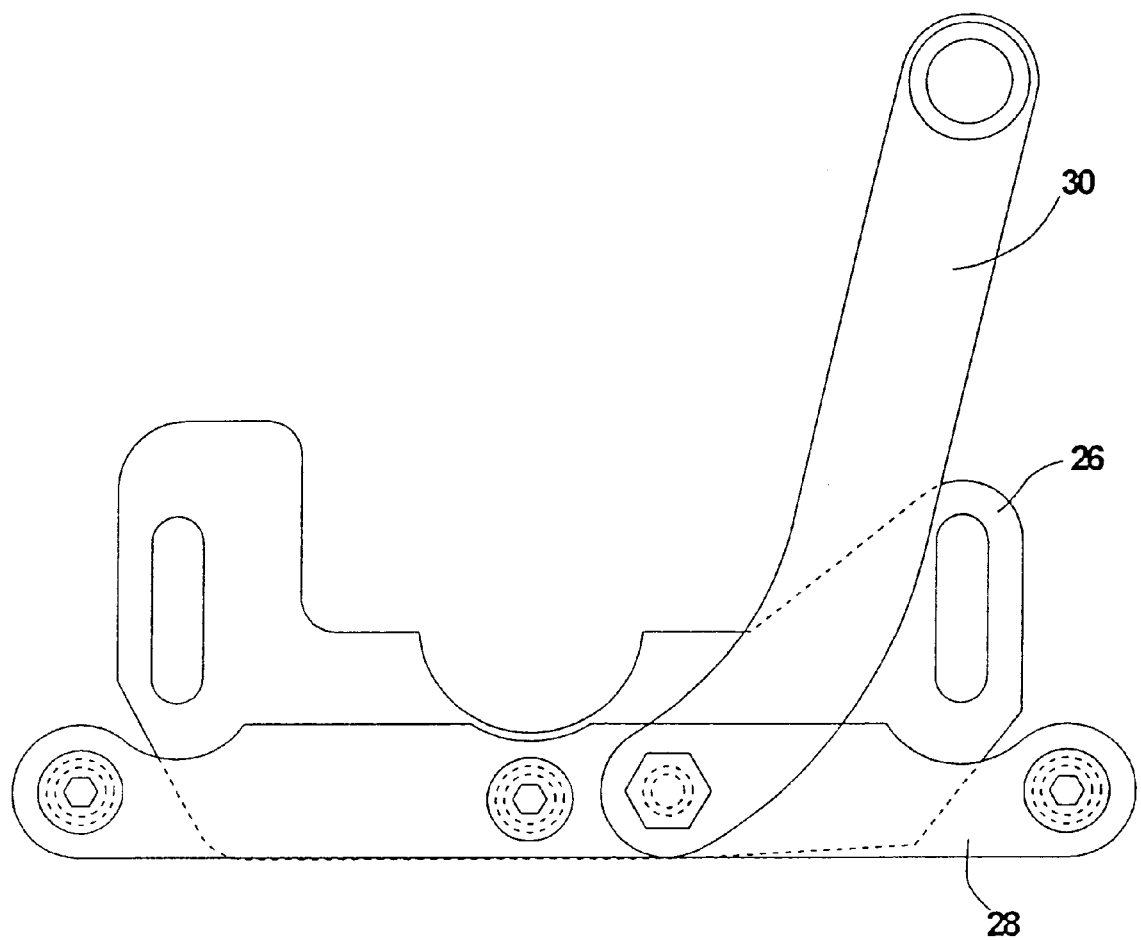
FIG. 4(*a*) is a side view of the first side of the flex-head cutting carriage in FIG. 2.
Figure 4B:
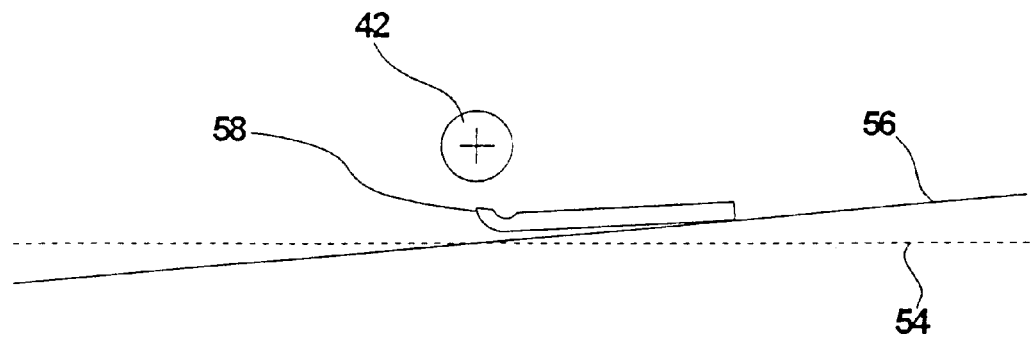
Figure 5:
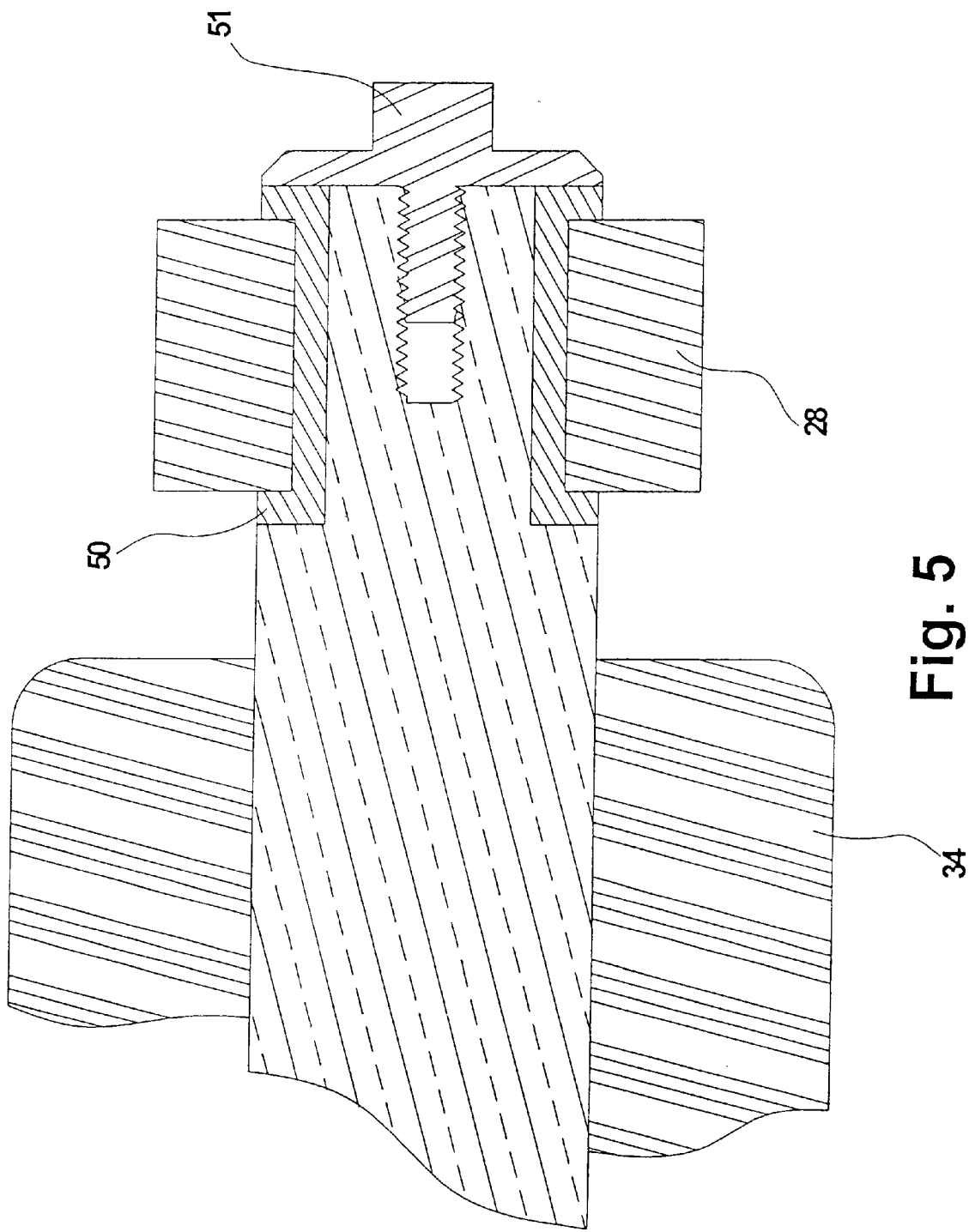
FIG. 5 is a cross-sectional view taken along line 5—5 in FIG. 2.

FIG. 5 is a cross-sectional view of the roller mounting arrangement taken along line 5—5 in FIG. 2. In the embodiment of the invention shown in FIGS. 1–5, the variations in the angular orientation of the roller axes are accommodated by resilient bushings. It should be appreciated however that the bushing could be replaced by any other mechanical device capable of allowing the rollers 34, 36 to misalign with the arm 28 and the pivot frame member 26. For example, a spherical mounted bushing or rod end fitted within arm 28 could also be used for this purpose. Such bushings are commercially available and designed to accommodate axial pivoting.

Because the flex-head invention is contemplated for use in diverse conditions, other variations of the roller mount described here are also possible. For example, cutting units designed for extremely high precision mowing (i.e. golf course putting greens) may require a bushing made from a relatively hard material for the purpose of ensuring that the roller is not capable of moving vertically within its mount, which could undesirably result in a variance of height of cut. Where very low heights of cut are required, such variance may result in undesirable "scalping" of the turf. Another example is a cutting unit designed for golf course roughs, where the minor variations in height are less important, and other operating factors such as shock load make use of a softer bushing compound more desirable. Where the material used for the bushing is hard, the designer may choose to facilitate the ability of the roller axis to pivot relative to the axis of the mount by incorporating a slight curvature or "barrel shape" into the design of the roller axle where it fits inside the bushing. Where the bushing material is soft, a plain cylindrical shape for the roller end may be adequate. The intended design will preferably have zero clearance between the bore of the bushing and the roller end, it being possible to specify the fit between the roller end and the bushing. The degree of "tightness" of this fit is preferably determined empirically. Alternatively, a small amount of clearance may designed between the roller end and the bushing. Regardless of the particulars of the mount design, the roller axis must be able to pivot about the axis of the mount freely, within the parameters required for the intended application.

Also, it should also be recognized that although the invention is depicted in FIGS. 1 and 2 with a pivot arm on only one side of the suspension carriage, the invention is not limited in this regard. A pivot arm 28 could be used on both ends of the suspension carriage 40 to provide even greater flexibility and terrain tracking ability. In such case, both sides of the carriage unit 40 would have a pivot arm arrangement as shown in FIG. 3.

According to a preferred embodiment of the invention, arm 28 is configured so that both roller mounts are located as close as is practical to the pivot point 44. This feature is best shown in the side view of the pivot frame member 26 in FIG. 4(a). The ability of arm 28 to pivot allows the rollers 34, 36 to more closely adapt to or follow the terrain. In a preferred embodiment, the fulcrum of the arm 28 is located as close as possible to a vertical alignment with the leading edge of the bed knife, where the cutting action takes place, and as close as possible to the ground. In this way, any variations in the height of cut are minimized, as the arm 28 rotates about its pivot point defined by bore 44. This feature is illustrated in FIG. 4(b), wherein the ground surface along the carriage frame member side of the roller is indicated by a dashed line 54, and the ground surface on the side of the rollers mounted to arm 28, is shown by a solid line 56, at a 5 degree pitch. Despite the variations in the terrain from one side of the mower to the other, the distance from the ground to the cutting edge 58 of the bed knife remains essentially unchanged across the full width of cut as the arm 28 pivots about its fulcrum. Alternatively, the fulcrum could be located away from the preferred vertical alignment with the bed knife by as much as half the distance from the leading edge of the bed knife to either roller, where variations in height of cut that would occur are within design parameters for the intended application.

As is apparent from FIG. 4(a), when the carriage unit is placed on level ground, the roller mounts 52 (and therefore the rollers 34, 36) will both be positioned at roughly the same vertical position. However, when the carriage according to the present invention encounters a contoured terrain, the front and rear rollers 34, 36 will act in concert with arm 28, enabling the two rollers to adapt to terrain that is non-planar. Where the terrain is varied, the rollers will react in a way that will closely follow the terrain. Thus the flex head will have superior ability to accurately gauge contoured terrain, as opposed to the current state of the art cutting unit design, where the rollers are rigidly fixed and minor variations in the balance of the cutting unit are most likely to result in only one end of a roller being in contact with the ground. Further, the angular orientation of the roller's axes relative to a plane defined by the roller mounts, can vary relative to said plane as described above. This contour tracking is made possible by the pivoting action of arm 28 and by the resilient bushings 50 which are used in connection with the roller mounts.

The carriage suspension design as disclosed herein permits more accurate cutting of terrain having varying contours and produces a consistent height of cut, especially for grass cutting machines using multiple reel type mowers propelled by a vehicle. This is particularly advantageous when cutting units are ganged together to provide a wider overall cut because it provides cutting consistency from one reel cutting unit to another, which is an important feature.

Finally, the attachment point for the propulsion arm is preferably aligned as closely as possible with the plane defined by the longitudinal axes of the rollers. This feature, combined with a position of the propulsion arm between the two rollers ensures that distribution of downward force between the front and rear rollers will vary minimally as a function of roller drag and ground speed, and that roller penetration into the turf will be minimized. As compared to current state-of-the-art cutting units, the flex-head cutting unit will produce a more consistent cut as turf conditions vary.

I claim:

1. A carriage suspension for supporting a reel mower cutting unit comprising:

two or more elongated rollers extending between opposing ends of said carriage suspension;

an arm provided on at least one end of said carriage suspension and pivotally mounted thereto by means of an arm pivot, and configured for supporting one end of each of said rollers, said arm pivoting said two or more elongated rollers relative to said carriage suspension; and, coupling members provided on each end of said rollers, said coupling members enabling a longitudinal axis each said roller to vary in orientation relative to said carriage suspension.

2. The carriage suspension according to claim 1 wherein each of said coupling members are comprised of a resilient bushing.

3. The carriage suspension according to claim 1 further comprising a propulsion arm, said propulsion arm being mounted to said carriage suspension at opposing ends thereof by means of a pivot joint approximately coplanar with the plane defined by longitudinal axes of said rollers.

4. The carriage suspension according to claim 3 wherein an attachment point of said propulsion arm is located between said at least two rollers.

5. The carriage suspension according to claim 4 wherein the position of said pivot joint is positioned adjacent a rearward roller.

6. The carriage suspension according to claim 1 wherein said arm pivot is positioned for approximately vertical alignment with a leading edge of a bed knife.

7. A reel mower carriage unit for use with a traction vehicle and configured for supporting a turf cutting reel over contoured terrain, comprising:

first and second opposing carriage plates, at least one of said carriage plates having a pivot arm support formed thereon;

a pivot arm, pivotally mounted on said pivot arm support and having roller mounts formed on opposite ends thereof; and, a pair of elongated rollers extending between said carriage plates, at least one end of each of said elongated rollers mounted to said pivot arm by means of a coupling member, said pivot arm pivoting said pair of elongated rollers relative to said carriage plates, said coupling members enabling a longitudinal axis of each said roller to vary orientation relative to said carriage plates.

8. A carriage suspension for supporting a reel mower cutting unit comprising:

a pair of elongated rollers spaced apart from each other, each of said elongated rollers pivotally mounted on at least one end thereof to a pivot arm by means of a coupling members, said coupling members enabling a longitudinal axis of each said roller to vary in orientation relative to said carriage suspension; and, said pivot arm pivotally mounted to a carriage frame member, said pivot arm pivoting said pair of elongated rollers relative to said carriage suspension.

9. In a mowing unit having a pair of elongated rollers mounted to opposing carriage frame members, and designed for towing behind a vehicle, a propulsion system comprising:

a propulsion arm mounted to opposing ends of said carriage frame by means of a pair of pivot joints, opposing arm ends of said propulsion arm configured for pivoting in a plane defined approximately transverse to the longitudinal axes of said rollers, said pivot joints positioned between said rollers and approximately coplanar with the plane defined by longitudinal axes of said rollers;

said opposing arm ends attached to a transverse member extending between said opposing ends of said carriage frame and provided with a tow bar configured for attachment to a vehicle.

* * * * *

UNITED STATES PATENT AND TRADEMARK OFFICE
CERTIFICATE OF CORRECTION

PATENT NO. : 5,950,409
DATED : September 14, 1999
INVENTOR(S) : Davies

It is certified that error appears in the above-identified patent and that said Letters Patent is hereby corrected as shown below:

In column 4, line 1, replace "Are" with --are--.
In column 8, claim 8, line 6, replace "members" with --member--.

Signed and Sealed this

Fourth Day of July, 2000

Attest:

Q. TODD DICKINSON

Attesting Officer

Director of Patents and Trademarks